(12) United States Patent
Kim et al.

(10) Patent No.: US 11,923,615 B2
(45) Date of Patent: Mar. 5, 2024

(54) CLAMPING APPARATUS FOR ANTENNA

(71) Applicant: KMW INC., Hwaseong-si (KR)

(72) Inventors: In Ho Kim, Yongin-si (KR); Seong Man Kang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 185 days.

(21) Appl. No.: 17/676,260

(22) Filed: Feb. 21, 2022

(65) Prior Publication Data

US 2022/0190473 A1 Jun. 16, 2022

Related U.S. Application Data

(63) Continuation of application No. PCT/KR2020/011551, filed on Aug. 28, 2020.

(30) Foreign Application Priority Data

Aug. 30, 2019 (KR) .................. 10-2019-0106969
Jun. 15, 2020 (KR) .................. 10-2020-0072520

(51) Int. Cl.
  *H01Q 3/08* (2006.01)
  *F16H 57/00* (2012.01)
  (Continued)

(52) U.S. Cl.
  CPC ........... *H01Q 3/08* (2013.01); *F16H 57/0006* (2013.01); *F16M 11/10* (2013.01); *F16M 11/18* (2013.01);
  (Continued)

(58) Field of Classification Search
  CPC .......... H01Q 1/005; H01Q 1/246; H01Q 1/12; H01Q 3/02–08; H01Q 3/32; F16M 11/08–10; F16M 13/02; F16H 57/0006
  See application file for complete search history.

(56) References Cited

U.S. PATENT DOCUMENTS 5,281,975 A    1/1994 Hugo
10,734,712 B2 * 8/2020 Duan ................. H01Q 1/246
(Continued)

FOREIGN PATENT DOCUMENTS

CN    107645032 A    1/2018
EP    3961801 A1    3/2022
(Continued)

OTHER PUBLICATIONS

First office action dated Jul. 15, 2022 from the Indian Patent Office for Indian Application No. 202217011052.
(Continued)

*Primary Examiner* — Hasan Islam
(74) *Attorney, Agent, or Firm* — Insight Law Group, PLLC; Seung Lee

(57) ABSTRACT

The present invention relates to a clamping apparatus for an antenna, the clamping apparatus including a rotation unit configured to rotate an antenna in a horizontal direction, a tilting unit configured to rotate the antenna in a vertical direction, and a rotation/vibration prevention unit configured to adjust a direction of the antenna by rotating at least one of the rotation unit and the tilting unit and prevent the antenna from arbitrarily rotating after the direction of the antenna is adjusted, in which the rotation/vibration prevention unit includes a rotation motor, a worm gear configured to be rotated by the rotation motor, a shaft configured to define at least one rotation center, and a worm wheel gear installed on an outer peripheral surface of the shaft and configured to rotate at least one of the rotation unit and the tilting unit while being rotated by the worm gear, thereby easily adjusting the direction of the antenna by controlling the rotation motor and preventing the antenna with the adjusted direction from arbitrarily rotating.

11 Claims, 19 Drawing Sheets

(51) Int. Cl.
  *F16M 11/10* (2006.01)
  *F16M 11/18* (2006.01)
  *F16M 11/20* (2006.01)
  *F16M 13/02* (2006.01)
  *H01Q 1/00* (2006.01)
  *H01Q 1/12* (2006.01)
  *F16F 15/073* (2006.01)

(52) U.S. Cl.
  CPC ........ *F16M 11/2014* (2013.01); *F16M 13/02* (2013.01); *H01Q 1/005* (2013.01); *H01Q 1/125* (2013.01); *F16F 15/073* (2013.01); *F16M 2200/024* (2013.01)

(56) References Cited

U.S. PATENT DOCUMENTS

| | | | |
|---|---|---|---|
| 11,005,177 B2* | 5/2021 | Clifford | H01Q 3/06 |
| 2015/0059500 A1 | 3/2015 | Conrad et al. | |
| 2015/0144758 A1* | 5/2015 | Kolokotronis | H01Q 1/1228 248/282.1 |
| 2018/0083356 A1 | 3/2018 | Ligander et al. | |

FOREIGN PATENT DOCUMENTS

| | | |
|---|---|---|
| JP | 62-037417 U | 3/1987 |
| JP | 05-168198 A | 7/1993 |
| JP | H05-218720 A | 8/1993 |
| JP | 06-048203 U | 6/1994 |
| JP | H06-048203 U | 6/1994 |
| JP | 2002-043818 A | 2/2002 |
| JP | 2013-197855 A | 9/2013 |
| KR | 10-1998-0031728 A | 7/1998 |
| KR | 20-1999-0029325 U | 7/1999 |
| KR | 2011-0001413 U | 2/2011 |
| KR | 2018-0088075 A | 8/2018 |
| KR | 10-1899928 B1 | 9/2018 |
| KR | 10-2019-0092715 A | 8/2019 |
| KR | 10-2095871 B1 | 4/2020 |

OTHER PUBLICATIONS

Non-final office action dated Mar. 7, 2023 from the Japanese Patent Office for Japanese Application No. 2022-512800.
Hearing Notice mailed Apr. 21, 2023 from the Indian Patent Office for Indian Application No. 2022-17011052.
International search report dated Dec. 10, 2020 for International application No. PCT/KR2020/011551 and its English translation.
Extended European Search Report dated Sep. 11, 2023 from the European Patent Office for European Application No. 20857238.8.

* cited by examiner

CLAMPING APPARATUS FOR ANTENNA

CROSS-REFERENCE TO RELATED APPLICATIONS

This application is a Continuation of International Application No. PCT/KR2020/011551, filed on Aug. 28, 2020, which claims the benefit of and priority to Korean Patent Application Nos. 10-2019-0106969, filed on Aug. 30, 2019; and 10-2020-0072520, filed on Jun. 15, 2020, the disclosure of which are herein incorporated by reference in their entirety.

TECHNICAL FIELD

The present invention relates to a clamping apparatus for an antenna, and more particularly, to a clamping apparatus for an antenna, which is capable of efficiently disposing an antenna in a dense installation space and easily adjusting a direction of the antenna.

BACKGROUND ART

In general, as an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about 10 times is ensured by using the same frequency band in comparison with the current single antenna system.

Eight antennas are used in 4G LTE-advanced, and a product equipped with 64 or 128 antennas has been developed in a pre-5G step. Base station equipment having a much large number of antennas has been used in 5G, which refers to a massive MIMO technology. The current cell management is 2-dimension, but 3D-beamforming may be enabled when the massive MIMO technology is introduced, which also represents a full-dimension (FD) MIMO.

In the massive MIMO technology, the number of transmitters and the number of filters are increased as the number of antennas (ANTS) is increased. Nevertheless, because of cost of lease or spatial restriction in respect to an installation location, RF components (antennas, filters, power amplifiers, transceivers, etc.) are practically manufactured to be small in size, light in weight, and inexpensive. Further, the massive MIMO requires a high output to expand a coverage, but electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna apparatus installed on a single support pole.

Further, there is also a need for a technical configuration for maintaining a predetermined direction of the antenna installed on the support pole according to an external environment.

DISCLOSURE

Technical Problem

A technical object of the present invention is to provide a clamping apparatus for an antenna, which is capable of improving a degree of installation freedom and workability at the time of installing an antenna on a support pole with many spatial restrictions.

Another technical object of the present invention is to provide a clamping apparatus for an antenna, which is capable of maintaining a predetermined direction of an antenna by preventing the antenna installed on a support pole from arbitrarily tilting and rotating.

The technical problems of the present invention are not limited to the aforementioned technical problem, and other technical problems, which are not mentioned above, may be clearly understood by those skilled in the art from the following descriptions.

Technical Solution

To achieve the above-mentioned objects, the present invention provides a clamping apparatus for an antenna, the clamping apparatus including: a rotation unit configured to rotate an antenna in a horizontal direction; a tilting unit configured to rotate the antenna in a vertical direction; and a rotation/vibration prevention unit configured to adjust a direction of the antenna by rotating at least one of the rotation unit and the tilting unit and prevent the antenna from arbitrarily rotating after the direction of the antenna is adjusted, in which the rotation/vibration prevention unit includes: a rotation motor; a worm gear configured to be rotated by the rotation motor; a shaft configured to define at least one rotation center; and a worm wheel gear installed on an outer peripheral surface of the shaft and configured to rotate at least one of the rotation unit and the tilting unit while being rotated by the worm gear.

Worm wheel gear teeth of the worm wheel gear may be provided in the form of spur gear teeth.

Worm wheel gear teeth of the worm wheel gear may be provided in the form of helical gear teeth.

The rotation/vibration prevention unit may further include an inner damping idle gear. The inner damping idle gear may be provided between the worm gear and the worm wheel gear, one side of the inner damping idle gear may engage with worm gear teeth of the worm gear, and the other side of the inner damping idle gear may engage with worm wheel gear teeth of the worm wheel gear.

The inner damping idle gear may be provided in the form of a spur gear.

The inner damping idle gear may be provided in the form of a worm wheel gear capable of engaging with the worm wheel gear teeth.

The rotation/vibration prevention unit may further include an outer damping idle gear. The worm gear may be provided between the outer damping idle gear and the worm wheel gear, one side of the worm gear may engage with gear teeth of the outer damping idle gear, and the other side of the worm gear may engage with worm wheel gear teeth of the worm wheel gear.

The outer damping idle gear may be provided in the form of a spur gear.

The outer damping idle gear may be provided in the form of a worm wheel gear capable of engaging with the worm wheel gear teeth.

The rotation/vibration prevention unit may further include: a brake gear provided at an end of the shaft; and an additional damping idle gear configured to engage with the brake gear.

The rotation/vibration prevention unit may further include: a motor bracket configured to support the worm gear so that the worm gear is rotatable; and a leaf spring damper provided at one side of the motor bracket and configured to elastically support the motor bracket to the worm wheel gear.

Other detailed matters of the embodiment are included in the detailed description and the drawings.

Advantageous Effects

The embodiment of the clamping apparatus for an antenna according to the present invention may achieve the following various effects.

First, since the direction of the antenna may be automatically adjusted by the tilting unit and the rotation unit, it is possible to improve the workability of the operators in working sites.

Second, it is possible to prevent the direction of the antenna fixed by the tilting unit and the rotation unit from arbitrarily tilting or rotating, thereby maintaining signal transmission reliability of the antenna.

The effects of the present invention are not limited to the aforementioned effects, and other effects, which are not mentioned above, will be clearly understood by those skilled in the art from the claims.

BEST MODE

Figure 1:
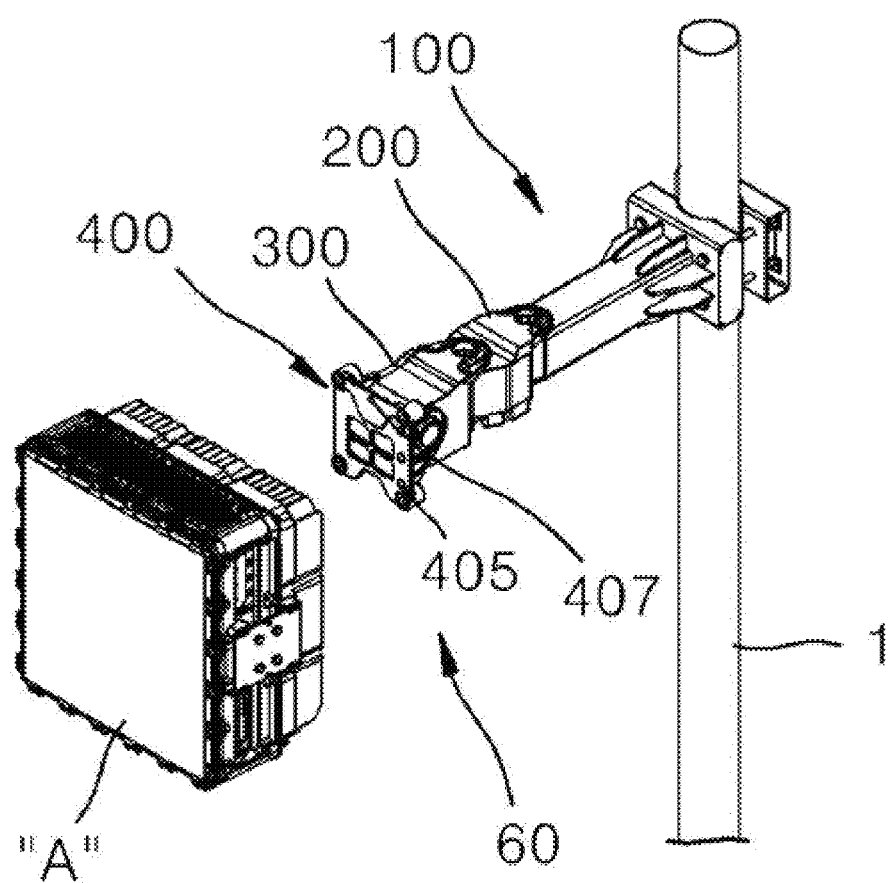
FIG. 1 is a perspective view illustrating a state in which a clamping apparatus for an antenna according to an embodiment of the present invention is installed on a support pole.

Hereinafter, embodiments of a clamping apparatus for an antenna according to the present invention will be described in detail with reference to the accompanying drawings. In assigning reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of publicly known configurations or functions incorporated herein will be omitted when it is determined that the detailed description obscures the subject matters of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Figure 2:
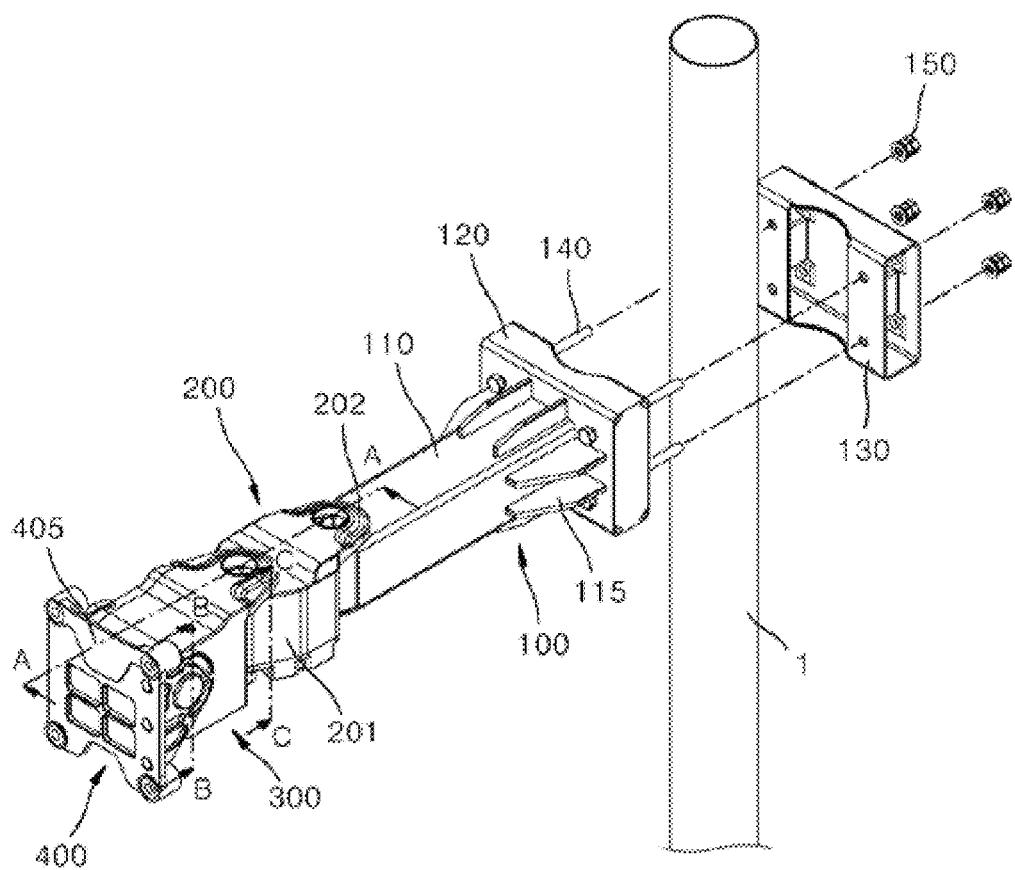
FIG. 2 is an exploded perspective view illustrating a state in which an antenna illustrated in FIG. 1 is excluded.
Figure 3A:
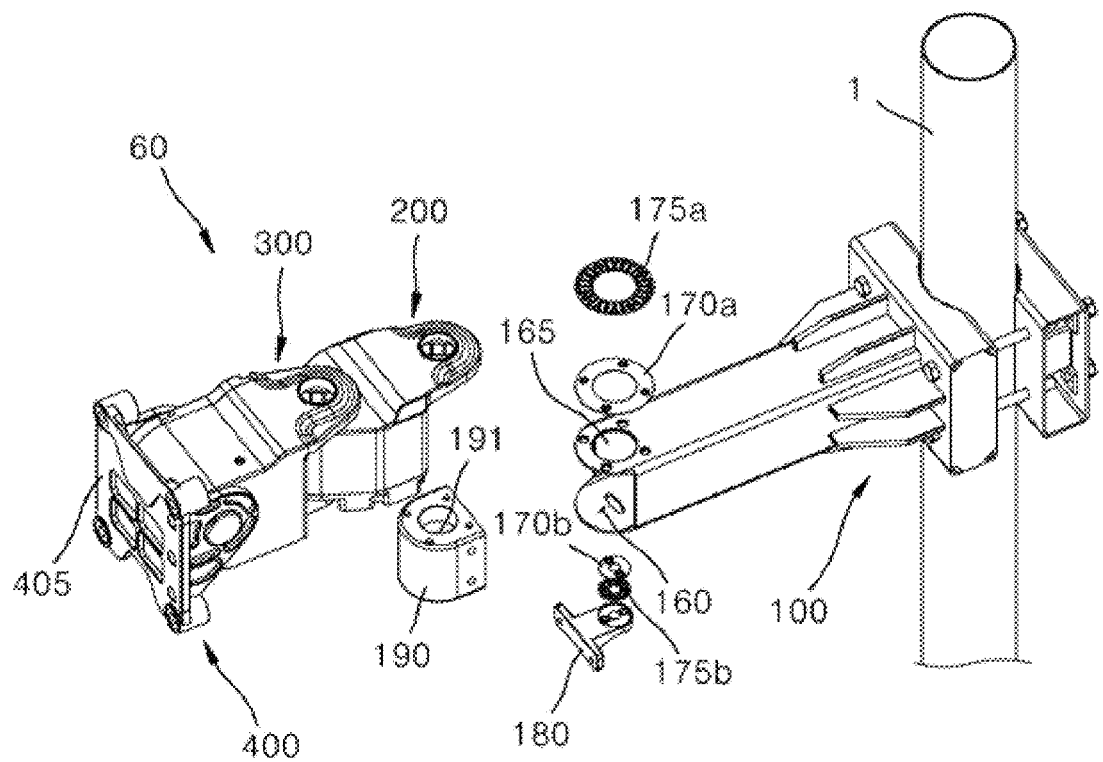
FIGS. 3A and 3B are exploded perspective views illustrating a state in which a common coupling unit is disassembled from an arm unit in a configuration of the clamping apparatus for an antenna according to the embodiment of the present invention.
Figure 3B:
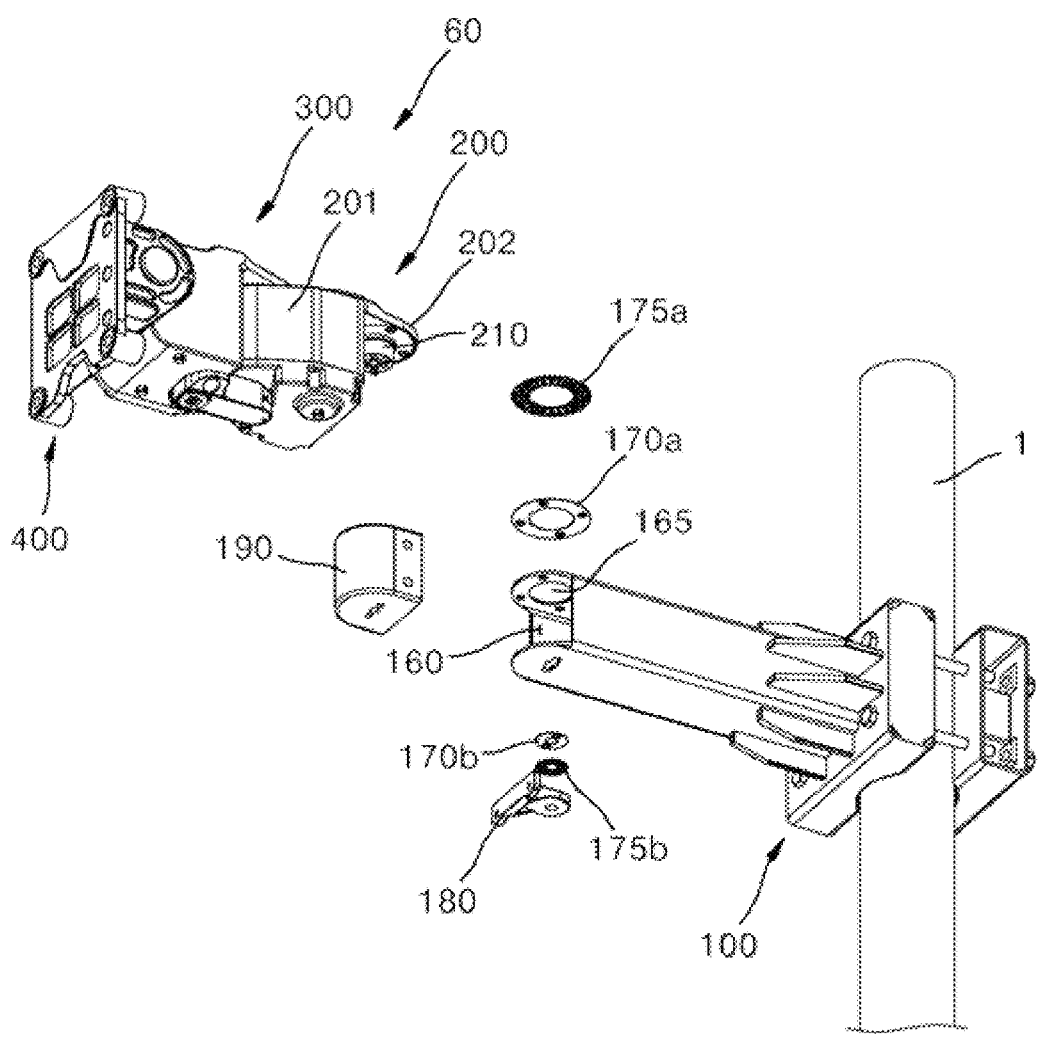
Figure 4A:
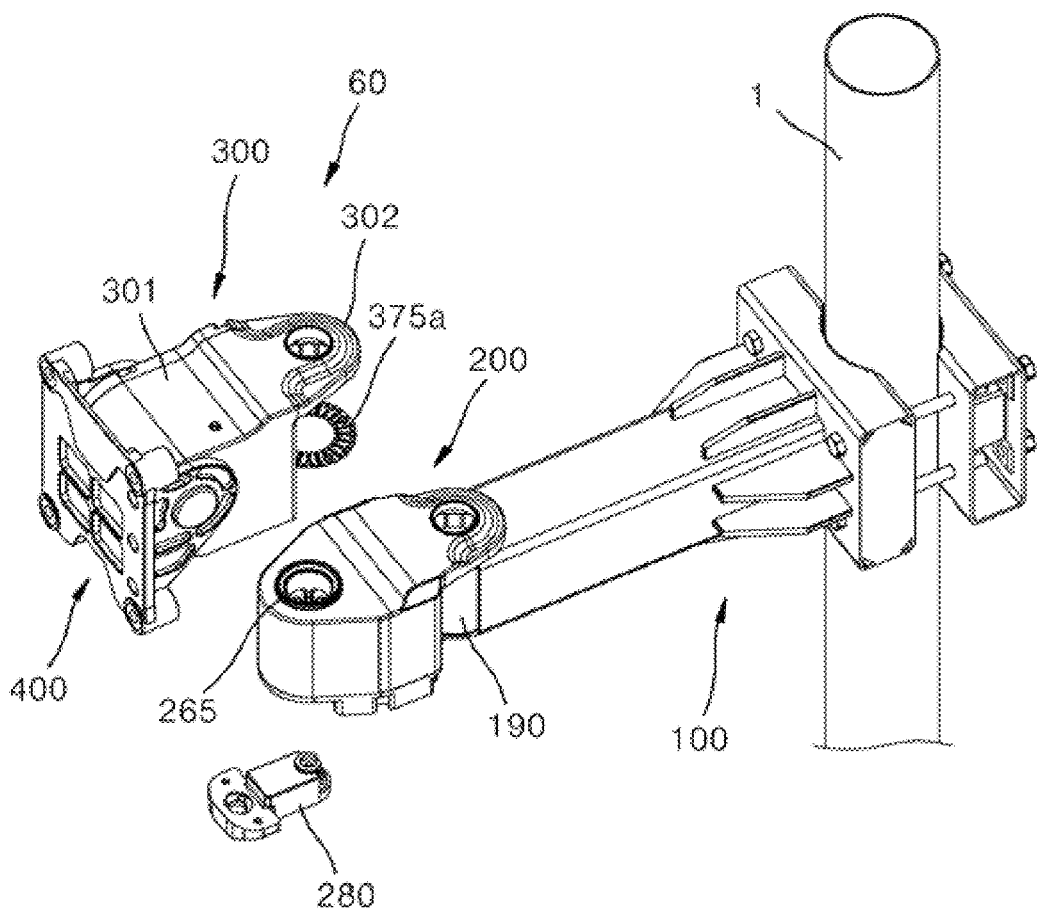
FIGS. 4A and 4B are exploded perspective views illustrating a state in which a rotation unit is disassembled from the common coupling unit in the configuration of the clamping apparatus for an antenna according to the embodiment of the present invention.
Figure 4B:
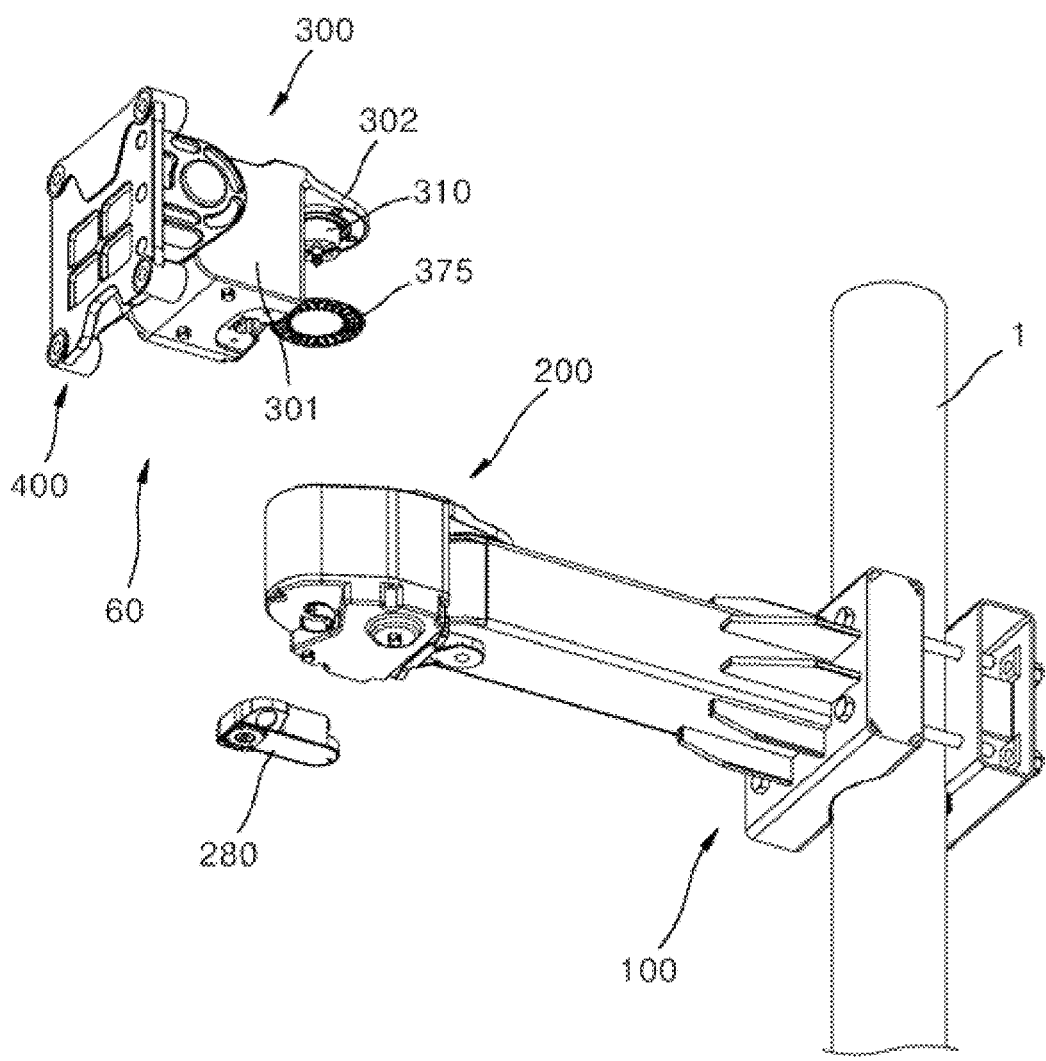
Figure 5A:
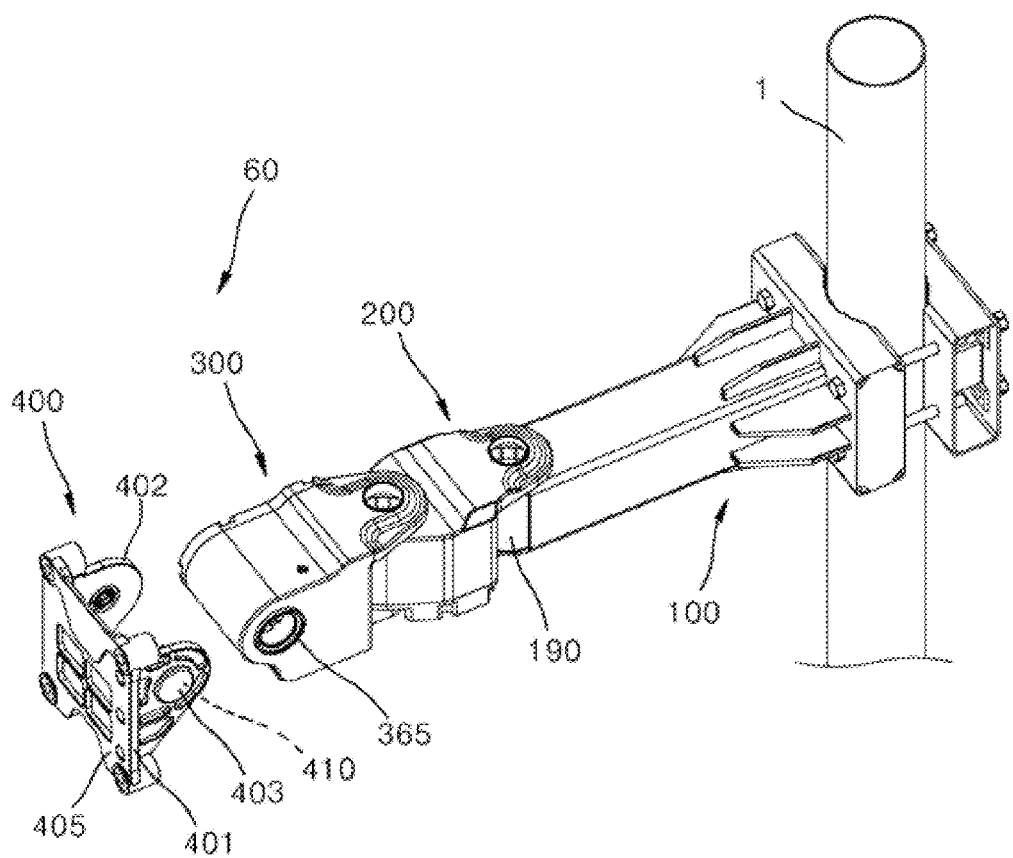
FIGS. 5A and 5B are exploded perspective views illustrating a state in which a tilting unit is disassembled from the rotation unit in the configuration of the clamping apparatus for an antenna according to the embodiment of the present invention.
Figure 5B:
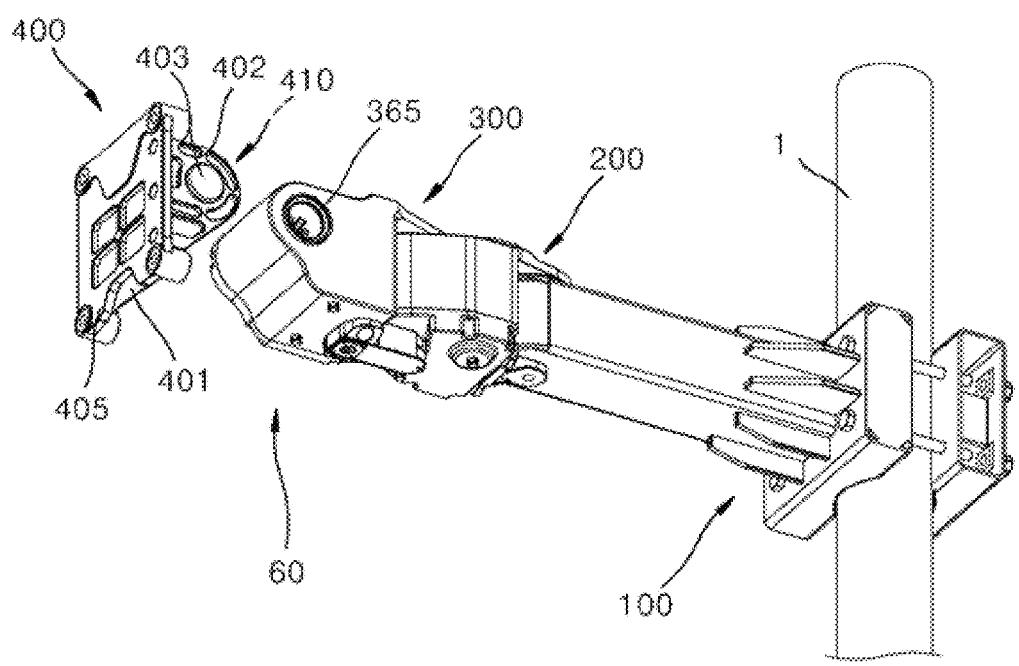

FIG. 1 is a perspective view illustrating a state in which a clamping apparatus for an antenna according to an embodiment of the present invention is installed on a support pole, FIG. 2 is an exploded perspective view illustrating a state in which an antenna illustrated in FIG. 1 is excluded, FIGS. 3A and 3B are exploded perspective views illustrating a state in which a common coupling unit is disassembled from an arm unit in a configuration of the clamping apparatus for an antenna according to the embodiment of the present invention, FIGS. 4A and 4B are exploded perspective views illustrating a state in which a rotation unit is disassembled from the common coupling unit in the configuration of the clamping apparatus for an antenna according to the embodiment of the present invention, and FIGS. 5A and 5B are exploded perspective views illustrating a state in which a tilting unit is disassembled from the rotation unit in the configuration of the clamping apparatus for an antenna according to the embodiment of the present invention.

Referring to FIGS. 1 to 5B, a clamping apparatus for an antenna according to an embodiment of the present invention may include an arm unit 100 coupled to a support pole 1, a common coupling unit 200 coupled to the arm unit 100, a rotation unit 300 coupled to the common coupling unit 200 so as to be rotatable in a horizontal direction, and a tilting unit 400 coupled to the rotation unit 300 so as to be rotatable in a vertical direction and coupled to the antenna A. In this case, the rotation in the horizontal direction may be identical to a rotating rotation, and the rotation in the vertical direction may be identical to a tilting rotation. That is, the rotation in the horizontal direction and the rotating rotation may mean a rotation about a vertical axis as a rotation center. In addition, the rotation in the vertical direction and the tilting rotation may mean a rotation about a horizontal axis as a rotation center.

The arm unit 100 may serve to mediate the coupling between the common coupling unit 200 and the support pole 1.

Referring to FIG. 2, the arm unit 100 may include: an arm main body 110 extending by a predetermined length from the support pole 1 toward one side in a horizontal direction; a stationary bracket 120 integrated with the other end of ends of the arm main body 110 which corresponds to the support pole 1, the stationary bracket 120 being coupled to be in close contact with one side of an outer peripheral surface of the support pole 1; and a separable bracket 130 coupled to the stationary bracket 120 by means of a plurality of long fixing bolts 140 and coupled to be in close contact with the other side of the outer peripheral surface of the support pole 1. Ends of the plurality of long fixing bolts 140 may be coupled to fixing nuts 150 provided on the separable bracket 130.

A plurality of reinforcing ribs 115 may be integrated with the other end of the arm main body 110 and improve rigidity of the coupling part between the arm main body 110 and the stationary bracket 120. The arm main body 110 and the stationary bracket 120 may be made of metal and integrated with each other. However, the arm main body 110 and the stationary bracket 120 need not be necessarily integrated by injection molding. The arm main body 110 and the stationary bracket 120 may be separately manufactured and then integrated with each other by welding or the like.

Meanwhile, the arm main body 110 and the stationary bracket 120 may be made of metal and integrally manufactured in a mold. The separable bracket 130 may also be made of metal and manufactured by using a mold different from the mold used to manufacture the arm main body 110 and the stationary bracket 120.

As described above, the stationary bracket 120 and the separable bracket 130 of the arm unit 100 are coupled to each other by bolting and extend by a predetermined length in the horizontal direction perpendicular to a longitudinal direction of the support pole 1, such that the antenna A may be installed to be spaced apart from the support pole 1 by a predetermined length.

The common coupling unit 200 may be coupled to a tip portion of the arm main body 110 of the arm unit 100 first and mediate coupling of a clamping unit 60 which is manufactured according to various specifications and will be described below. However, according to the embodiments, the rotation unit 300 may be installed directly to the tip portion of the arm main body 110 without the common coupling unit 200 (see FIGS. 8 and 9 to be described below).

Hereinafter, the description will be made on the premise that the rotation unit 300 is installed on the tip portion of the arm main body 110 of the arm unit 100 by means of the common coupling unit 200. The common coupling unit 200 is basically similar in shape to the rotation unit 300. The common coupling unit 200 may be structured to be fixed to the tip portion of the arm main body 110 or selectively rotated together with the rotation unit 300 when an additional horizontal rotating rotation of the antenna A is required.

Referring to FIGS. 3A and 3B, the common coupling unit 200 may include one end common coupling portion 201 having one end providing a coupling portion to which the rotation unit 300 is coupled, and the other end common coupling portion 202 extending by a predetermined length from an upper end of one end common coupling portion 201 toward the other side and having a coupling shaft 210 extending downward by a predetermined length, the coupling shaft 210 being an axis and serving as a coupling element.

A rotating angle adjustment unit 230 of rotation/vibration prevention units 230 and 330 to be described below may be embedded in one end common coupling portion 201 of the common coupling unit 200. This configuration will be described below in detail.

A fixing shaft hole block 190 for coupling the common coupling unit 200 may be provided at the tip portion of the arm main body 110 of the arm unit 100.

In more detail, the arm main body 110 may have a quadrangular tubular shape having a vacant space therein, the tip portion of the arm main body 110 may be opened in one direction, and upper and lower ends of the arm main body 110 may protrude in a semi-circular shape.

The fixing shaft hole block 190 may be inserted into and fixed to the opened tip portion of the arm main body 110 and have a shape corresponding to a vacant internal space 160 of the tip portion of the arm main body 110. Since the fixing shaft hole block 190 corresponds to the vacant internal space 160 of the tip portion of the arm main body 110, an external shape of one end of the fixing shaft hole block 190 may be in the form of a circular column having an approximately semi-circular horizontal cross-section, and an external shape of the other end of the fixing shaft hole block 190 may have a quadrangular block shape.

The fixing shaft hole block 190 may have a shaft insertion hole 191 to which the coupling shaft 210 of the common coupling unit 200 is axially installed from above to below. Further, a shaft through-hole 165 may be formed at an upper side of the tip portion of the arm main body 110 so that the coupling shaft 210 of the common coupling unit 200 penetrates the shaft through-hole 165 and is inserted into the shaft insertion hole 191 formed in the fixing shaft hole block 190.

The coupling shaft 210 may be coupled to the shaft insertion hole 191 by any one of interference-fit coupling, screw coupling, and bolting. The clamping apparatus for an antenna according to the embodiment of the present invention has the structure in which the coupling shaft 210 of the common coupling unit 200 is inserted into the shaft insertion hole 191 of the fixing shaft hole block 190 from above to below, matched in shape with the shaft insertion hole 191 of the fixing shaft hole block 190, and then securely fixed by non-illustrated fixing bolts.

Meanwhile, a brake unit (no reference numeral) may be provided at the tip portion of the arm main body 110 of the arm unit 100 and generate a predetermined frictional force between the tip portion of the arm main body 110 and the common coupling unit 200.

The brake unit may include upper brake washer pads 170a and 175a provided at an upper side of the tip portion of the arm unit 100 and configured to generate a frictional force against an upper joint surface of the common coupling unit 200, and lower brake washer pads 170b and 175b provided at a lower side of the tip portion of the arm main body 110 of the arm unit 100 and configured to generate a frictional force against a lower joint surface of the common coupling unit 200.

The upper brake washer pads 170a and 175a and the lower brake washer pads 170b and 175b may respectively include fixing plate portions 170a and 170b fixed to the upper and lower sides of the tip portion of the arm main body 110 of the arm unit 100 and configured to provide a friction surface, and rotation plate portions 175a and 175b fixed to the upper or lower side of the common coupling unit 200 and configured to generate the frictional force against the fixing plate portions 170a and 170b while rotating.

The fixing plate portions 170a and 170b may include an upper fixing plate portion 170a fixed to the upper side of the tip portion of the arm main body 110 of the arm unit 100, and a lower fixing plate portion 170b fixed to the lower side of the tip portion of the arm main body 110 of the arm unit 100.

The lower brake washer pads 170b and 175b may be installed by means of a washer installation bracket 180 extending from a lower end of one end common coupling portion 201 of the common coupling unit 200 toward the other end and provided on a lower surface of the tip portion of the arm main body 110 so as to extend.

The rotation plate portions 175a and 175b may include an upper rotation plate portion 175a fixed to a lower surface of the other end common coupling portion 202 of the common coupling unit 200 and generate a frictional force against the upper fixing plate portion 170a while rotating, and a lower rotation plate portion 175b fixed to an upper surface of the washer installation bracket 180 and generate a frictional force against the lower fixing plate portion 170b while rotating.

The lower rotation plate portion 175b is provided on the upper surface of the washer installation bracket 180, and the lower fixing plate portion 170b is fixed to the lower side of the tip portion of the arm main body 110 of the arm unit 100, thereby generating a predetermined frictional force when the common coupling unit 200 rotates as the additional rotation is needed as described above.

Meanwhile, the clamping unit 60 may be configured to rotate or tilt to set a direction of antenna A while mediating the installation of the antenna A on the arm unit 100.

In more detail, the clamping unit 60 may include the common coupling unit 200 coupled to the tip portion of the arm main body 110 of the arm unit 100, the rotation unit 300 coupled to the tip portion of the common coupling unit 200, and the tilting unit 400 coupled to the rotation unit 300.

As illustrated in FIG. 1, the antenna A may be separably installed on the tilting unit 400.

As illustrated in FIG. 1, a bracket panel 405 may be attached to a front surface of the tilting unit 400, and a hook fastening bracket (not illustrated) may be provided on a rear surface of the antenna A coupled to the tilting unit 400 and spaced apart rearward from the rear surface of the antenna A.

An operator, who installs the antenna A, simply inserts and seats the hook fastening bracket into an installation groove provided in the tilting unit 400 from above to below in a state in which the hook fastening bracket is temporarily fixed to the rear surface of the antenna A. Then, the operator may securely assemble the antenna A and the tilting unit 400 by using hook fixing screws (not illustrated). Therefore, a plurality of operators is not required, and assembly properties may be improved.

Referring to FIGS. 4A and 4B, the rotation unit 300 may include one end rotation coupling portion 301 having one end providing a coupling portion to which the tilting unit 400 is coupled, and the other end rotation coupling portion 302 extending by a predetermined length from an upper end of one end rotation coupling portion 301 toward the other side and having a rotating shaft fixing portion 310 extending downward by a predetermined length, the rotating shaft fixing portion 310 being a rotation axis of the rotation unit 300.

The above-mentioned method of coupling the coupling shaft 210 to the shaft insertion hole 191 of the fixing shaft hole block 190 may be applied to couple the common coupling unit 200 of the rotating shaft fixing portion 310 to a shaft hole 231' (see FIG. 6) of a rotating shaft 231 provided on one end common coupling portion 201.

Meanwhile, a tilting angle adjustment unit 330 of the rotation/vibration prevention units 230 and 330 to be described below may be embedded in one end rotation coupling portion 301. This configuration will be described below in detail.

Referring to FIGS. 5A and 5B, the tilting unit 400 may include one end tilting coupling portion 401 having one end to which the antenna A is detachably coupled, and the other end tilting coupling portions 402 extending from two opposite left and right ends of one end tilting coupling portion 401 toward the other end and tiltably coupled to two opposite left and right walls of one end rotation coupling portion 301 of the rotation unit 300.

A tilting shaft fixing portion 410 may be provided on one of the other end tilting coupling portions 402 provided at the two opposite left and right sides, and the tilting shaft fixing portion 410 may be inserted into a tilting coupling hole 365 formed in one end rotation coupling portion 301.

The above-mentioned method of coupling the coupling shaft 210 to the shaft insertion hole 191 of the fixing shaft hole block 190 may be applied to couple the tilting shaft fixing portion 410 to a shaft hole 331' (see FIG. 6) of a tilting shaft 331 provided on one end rotation coupling portion 301.

The tilting shaft fixing portion 410 may be recessed from outside to inside the other end tilting coupling portion 402 so as to be fixed to the tilting shaft 331 by non-illustrated fixing bolts inserted and fastened from outside to inside. A tilting shield cap 403 may be coupled to an outer surface of the tilting shaft fixing portion 410 to cover the completely fastened and fixed fixing bolts from the outside.

The rotating shaft fixing portion 310 provided on the rotation unit 300 may serve as a center of the horizontal rotating rotation of the common coupling unit 200 or the arm unit 100 relative to the arm main body 110. Further, the tilting shaft fixing portion 410 provided on the tilting unit 400 may serve as a center of the vertical tilting rotation relative to the rotation unit 300.

As described above, in the clamping unit 60, the rotation unit 300 is coupled to the common coupling unit 200 so as to be rotatable about the rotating shaft fixing portion 310 in the horizontal direction, such that the antenna A may be rotated in the horizontal direction. The tilting unit 400 is coupled to be rotatable about the tilting shaft fixing portion 410 in the vertical direction, such that the antenna A may be rotated in the vertical direction.

Figure 6:
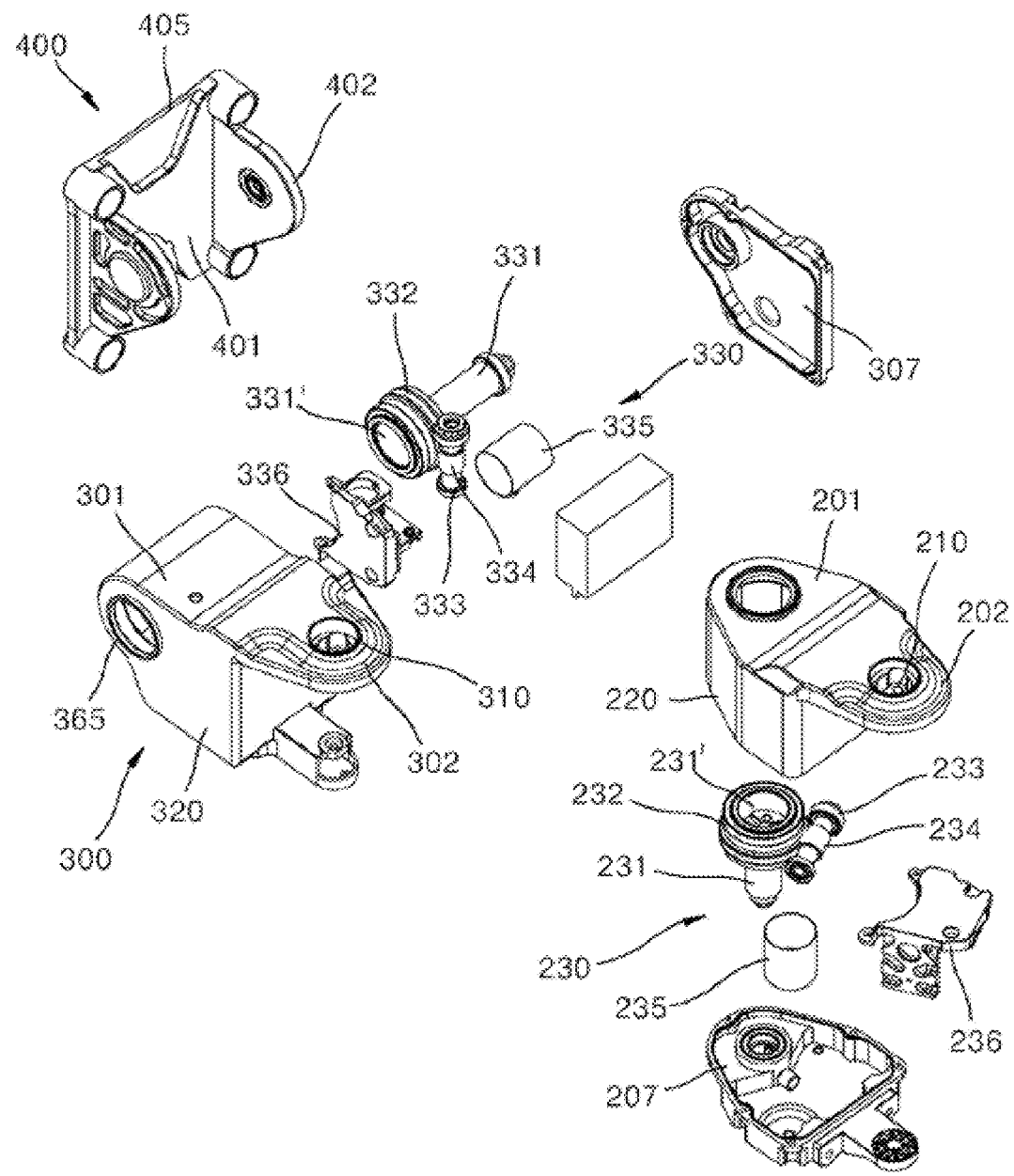
FIG. 6 is an exploded perspective view illustrating the tilting unit, the rotation unit, and the common coupling unit in the configuration of the clamping apparatus for an antenna according to the embodiment of the present invention.

FIG. 6 is an exploded perspective view of the tilting unit, the rotation unit, and the common coupling unit in the configuration of the clamping apparatus for an antenna according to the embodiment of the present invention.

Referring to FIG. 6, the clamping unit 60 may further include the rotation/vibration prevention units 230 and 330. The rotation/vibration prevention units 230 and 330 may be respectively provided in one end rotation coupling portion 301 of the rotation unit 300 and one end common coupling portion 201 of the common coupling unit 200 and configured to tilt the tilting unit 400 and rotate the rotation unit 300. In addition, the rotation/vibration prevention units 230 and 330 may prevent the tilting unit 400 and the rotation unit 300 from arbitrarily rotating from positions at which the tilting unit 400 and the rotation unit 300 are rotated and fixed.

The rotation/vibration prevention units 230 and 330 may include a rotating angle adjustment unit 230 installed in one end common coupling portion 201 of the common coupling unit 200, and a tilting angle adjustment unit 330 installed in one end rotation coupling portion 301 of the rotation unit 300.

The rotating angle adjustment unit 230 may rotate the rotation unit 300 and prevent the rotation unit 300 from arbitrarily rotating from the position at which the rotation unit 300 is rotated and fixed.

The tilting angle adjustment unit 330 may tilt the tilting unit 400 and prevent the tilting unit 400 from arbitrarily rotating from the position at which the tilting unit 400 is tilted and fixed.

The rotating angle adjustment unit 230 may include: the rotating shaft 231 vertically provided in the vertical direction in a coupling unit housing 220 configured to define one end common coupling portion 201 and having an internal space; a worm wheel gear 232 integrated with an outer peripheral surface of the rotating shaft 231 and having worm wheel gear teeth formed on an outer peripheral surface thereof; and a worm gear 233 disposed to be orthogonal to the rotating shaft 231 and having worm gear teeth 234 configured to engage with the worm wheel gear teeth of the worm wheel gear 232.

The worm gear 233 may be rotated by an operation of a rotation motor 235 provided in the coupling unit housing 220 and configured to operate electrically. The rotation motor 235 may be securely fixed in the coupling unit housing 220 by means of a motor bracket 236.

A shaft hole 231' may be formed at an end of the rotating shaft 231, and the shaft hole 231' is exposed to the outside through a rotating shaft through-hole 265 vertically penetratively formed in an upper portion of the coupling unit housing 220. The rotating shaft fixing portion 310 of the rotation unit 300 may be coupled to the shaft hole 231' of the rotating shaft 231 which is exposed through the rotating shaft through-hole 265.

Meanwhile, a lower side of the coupling unit housing 220 may be opened, and the opened lower side of the coupling unit housing 220 may be covered by the coupling unit cover 207. The operator may separate the coupling unit cover 207 from the coupling unit housing 220 and then maintain and repair the respective components of the rotating angle adjustment unit 230 embedded in the coupling unit housing 220.

The coupling unit cover 207 may support a rotation of a lower end of the rotating shaft 231 which is opposite to an upper end of the rotating shaft 231 at which the shaft hole 231' is formed. Further, the washer installation bracket 180 may be separately provided and then coupled to the coupling unit cover 207, or the washer installation bracket 180 may be integrated with the coupling unit cover 207.

The tilting angle adjustment unit 330 may include a tilting shaft 331 horizontally provided in the horizontal direction in a rotating housing 320 configured to define one end rotation coupling portion 301 and having an internal space; a worm wheel gear 332 integrated with an outer peripheral surface of the tilting shaft 331 and having worm wheel gear teeth 332 formed on an outer peripheral surface thereof; and a worm gear 333 disposed to be orthogonal to the rotating shaft 231 and having worm gear teeth 334 configured to engage with the worm wheel gear teeth 332 of the worm wheel gear 332.

The worm gears 233 and 333 may include the rotating worm gear 233 included in the rotating angle adjustment unit 230, and the tilting worm gear 333 included in the tilting angle adjustment unit 330.

The worm wheel gears 232 and 332 may include the rotating worm wheel gear 232 included in the rotating angle adjustment unit 230, and the tilting worm wheel gear 332 included in the tilting angle adjustment unit 330.

The worm gear 333 may be rotated by an operation of a rotation motor 335 provided in the rotating housing 320 and configured to operate electrically. The rotation motor 335 may be securely fixed in the rotating housing 320 by means of the motor bracket 336.

The rotation motors 235 and 335 may include the rotating rotation motor 235 provided in the common coupling unit 200 and configured to rotate the rotation unit 300 in the horizontal direction, and the tilting rotation motor 335 provided in the rotation unit 300 and configured to rotate the tilting unit 400 in the vertical direction.

A shaft hole 331' may be formed at an end of the tilting shaft 331, and the shaft hole 331' is exposed to the outside through a tilting shaft through-hole 365 penetratively formed leftward and rightward in one side wall of the rotating housing 320. The tilting shaft fixing portion 410 of the tilting unit 400 may be coupled to the shaft hole 331' of the tilting shaft 331 which is exposed through the tilting shaft through-hole 365.

Meanwhile, one side of the rotating housing 320 may be opened, and one open side of the rotating housing 320 may be covered by the rotating cover 307. The operator may separate the rotating cover 307 from the rotating housing 320 and then maintain and repair the respective components of the tilting angle adjustment unit 330 embedded in the rotating housing 320.

The rotating cover 307 may serve to support a rotation of the other end of the tilting shaft 331 which is opposite to one end of the tilting shaft 331 at which the shaft hole 331' is formed.

As described above, the rotation/vibration prevention units 230 and 330 may serve to automatically adjust the direction of the antenna A by rotating the rotation unit 300 and the tilting unit 400 and to prevent vibration so that the direction of the antenna A is not arbitrarily changed by an external environment in a state in which the direction of the antenna A is fixed.

Figure 7A:
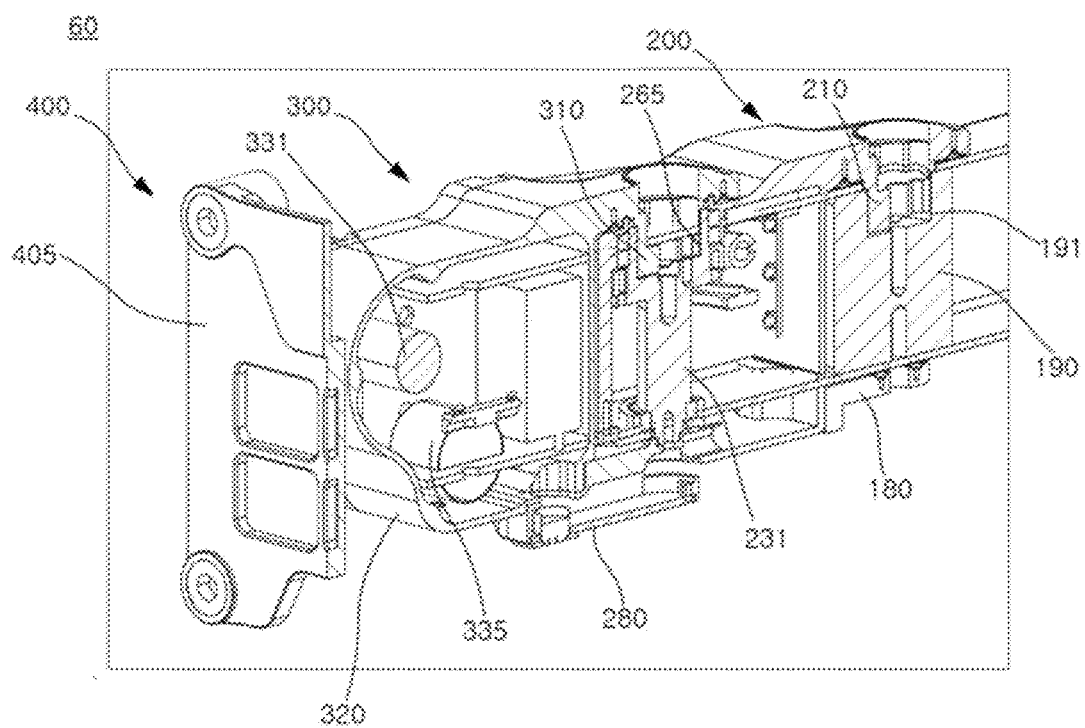
FIGS. 7A to 7C are cut-away perspective views taken along lines A-A, B-B, and C-C in FIG. 2.
Figure 7B:
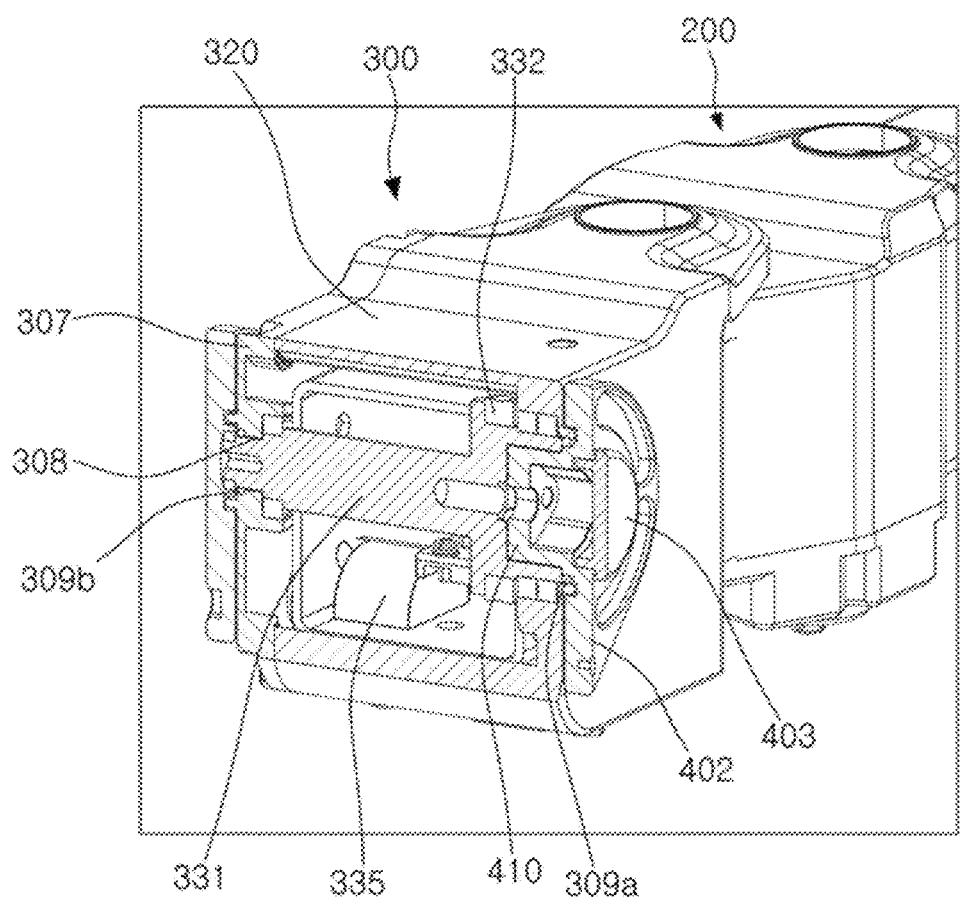
Figure 7C:
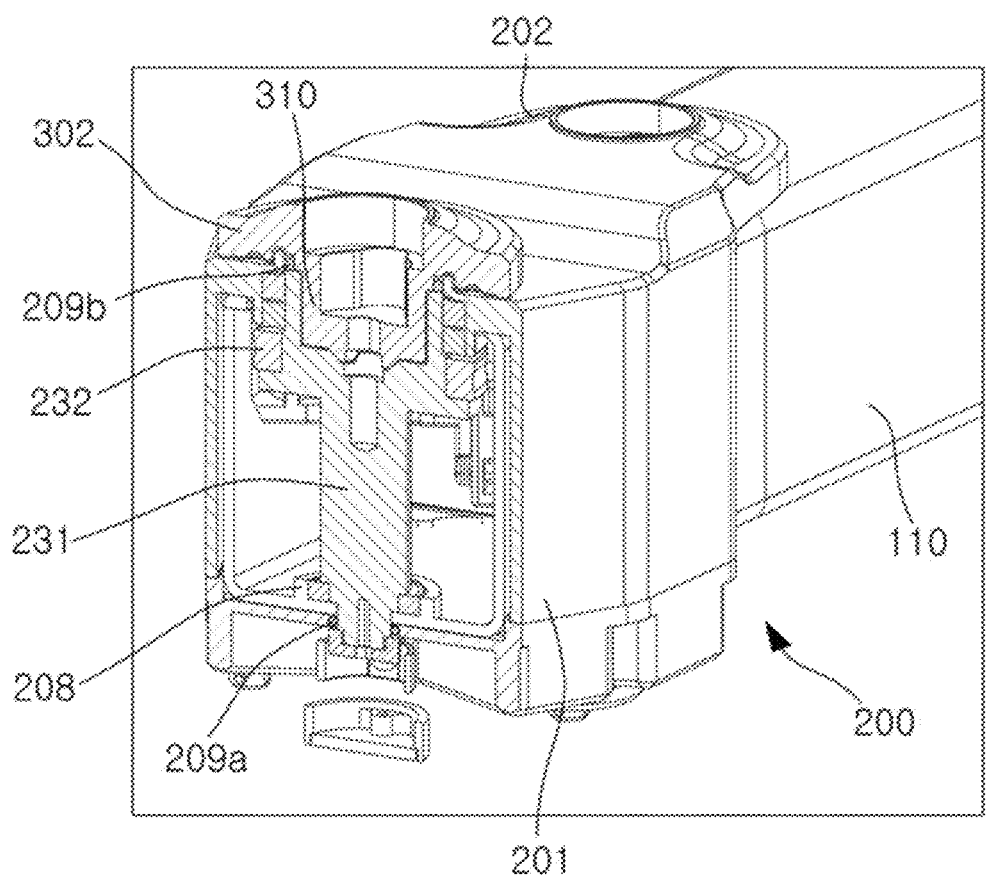

FIGS. 7A to 7C are cut-away perspective views taken along lines A-A, B-B, and C-C in FIG. 2.

Referring to FIGS. 7A to 7C, the tilting shaft 331 of the tilting angle adjustment unit 330 of the rotation/vibration prevention units 230 and 330 may be horizontally installed in the horizontal direction in the rotating housing 320. In addition, the rotating shaft 231 of the rotating angle adjustment unit 230 of the rotation/vibration prevention units 230 and 330 may be vertically installed in the vertical direction in the common coupling housing 220. Further, the coupling shaft 210 of the common coupling unit 200 may be vertically installed in the vertical direction on the fixing shaft hole block 190 having the shaft insertion hole 191 and formed in the vertical direction in the tip of the arm main body 110 of the arm unit 100.

In this case, as illustrated in FIG. 7B, the tilting shaft 331 of the tilting angle adjustment unit 330 may be coupled such that one end thereof surrounds a convex tip portion of the tilting shaft fixing portion 410. Further, the other end of the tilting shaft 331 may be penetratively coupled to a shaft fixing hole 308 penetratively formed in the rotating cover 307, and the two opposite ends of the tilting shaft 331 may be respectively sealed by one side seal 309a and the other side seal 309b.

In addition, as illustrated in FIG. 7C, the rotating shaft 231 of the rotating angle adjustment unit 230 is also coupled such that one end thereof surrounds a convex tip portion of the rotating shaft fixing portion 310. Further, the other end of the rotating shaft 231 may be penetratively coupled to a shaft fixing hole 208 penetratively formed in the coupling unit cover 207, and the two opposite ends of the rotating shaft 231 may be respectively sealed by one side seal 209a and the other side seal 209b.

Figure 8:
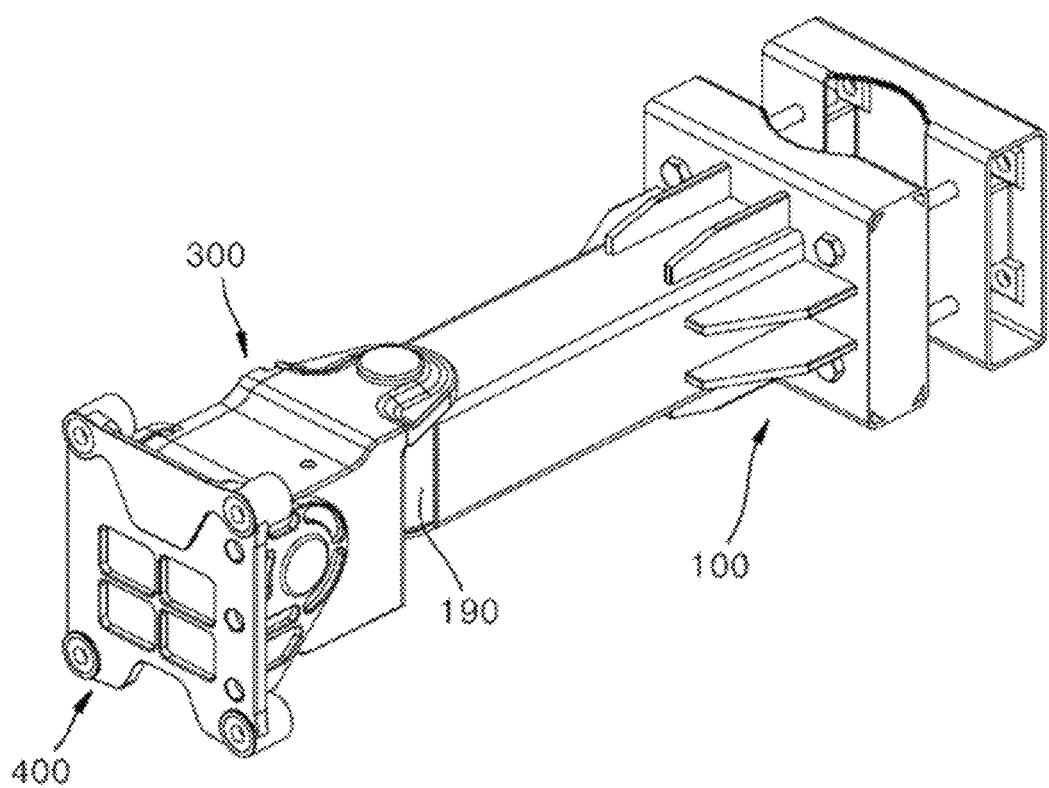
FIG. 8 is a perspective view illustrating a clamping apparatus for an antenna according to another embodiment of the present invention.
Figure 9:
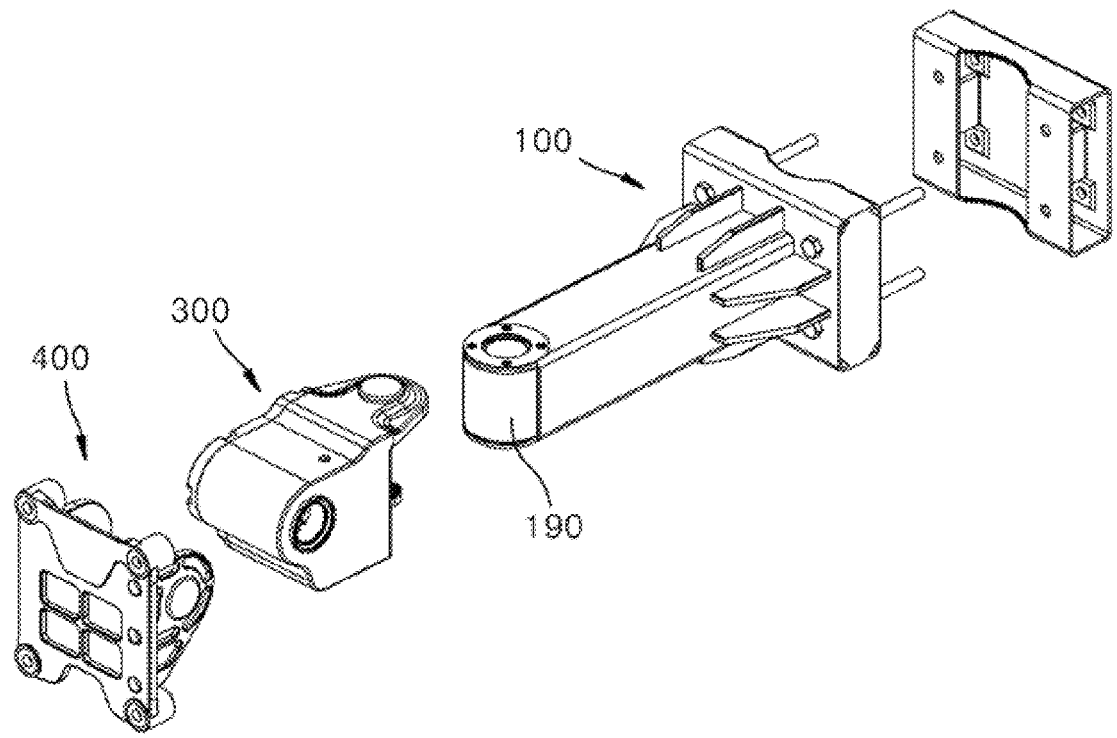
FIG. 9 is an exploded perspective view of FIG. 8.

FIG. 8 is a perspective view illustrating a clamping apparatus for an antenna according to another embodiment of the present invention, and FIG. 9 is an exploded perspective view of FIG. 8.

Referring to FIGS. 8 and 9, it can be seen that the clamping apparatus for an antenna according to another embodiment of the present invention is different from the clamping apparatus for an antenna according to the embodiment of the present invention described with reference to FIGS. 1 to 7C.

That is, according to the clamping apparatus for an antenna according to the embodiment of the present invention described with reference to FIGS. 1 to 7C, the rotation unit 300 of the clamping unit 60 is installed on the arm unit 100 by means of the common coupling unit 200.

In contrast, referring to FIGS. 8 and 9, in the clamping apparatus for an antenna according to another embodiment of the present invention the rotation unit 300 of the clamping unit 60 may be rotatably installed directly to the fixing shaft hole block 190 provided at the tip portion of the arm main body 110 of the arm unit 100 without the common coupling unit 200.

In addition, since the clamping apparatus for an antenna according to another embodiment of the present invention excludes the common coupling unit 200, the rotating angle adjustment unit 230, which is embedded in the common coupling unit 200 and configured to rotate the rotation unit 300 in the horizontal direction, may also be excluded. That is, an embodiment in which only the tilting angle adjustment unit 330 embedded in the rotation unit 300 remains unlike the above-mentioned embodiment in which the rotating angle adjustment unit 230 and the tilting angle adjustment unit 330 are provided, may be defined as another embodiment of the present invention.

Because all the other remaining components are identical to the components according to the above-mentioned embodiment of the present invention in terms of the configurations and coupling relationships, a detailed description thereof will be omitted.

Meanwhile, the clamping apparatus for an antenna according to another embodiment of the present invention has been described as excluding the common coupling unit 200 from the clamping apparatus for an antenna according to the embodiment of the present invention. However, the rotation unit 300 may be excluded, instead of the common coupling unit 200, from the clamping apparatus for an antenna according to the embodiment of the present invention. In this case, the tilting unit 400 may be coupled to the common coupling unit 200 so as to be rotatable in the horizontal direction.

That is, in the clamping apparatuses for an antenna according to the embodiments of the present invention, the rotation/vibration prevention units 230 and 330 may include at least one of the rotating angle adjustment unit 230 and the tilting angle adjustment unit 330 and rotate at least one of the rotation unit 300 and the tilting unit 400, thereby adjusting the direction of the antenna A and preventing the antenna A from arbitrarily rotating after the direction of the antenna A is adjusted.

In the case in which the rotation/vibration prevention units 230 and 330 include at least one of the rotating angle adjustment unit 230 and the tilting angle adjustment unit 330, the rotation motors 235 and 335 may include at least one of the rotating rotation motor 235 and the tilting rotation motor 335, the worm gears 233 and 333 configured to be rotated by the rotation motors 235 and 335 may also include at least one of the rotating worm gear 233 and the tilting worm gear 333, the shafts 231 and 331 configured to serve as the rotation center of at least one of the rotation unit 300 and the tilting unit 400 may also include at least one of the rotating shaft 231 and the tilting shaft 331, and the worm wheel gears 232 and 332, which are installed on the outer peripheral surfaces of the shafts 231 and 331 and rotate at least one of the rotation unit 300 and the tilting unit 400 by being rotated by the worm gears 233 and 333, may also include at least one of the rotating worm wheel gear 232 and the tilting worm wheel gear 332.

FIGS. 10 to 14 are perspective views illustrating various embodiments of the rotation/vibration prevention unit in the configuration of the clamping apparatus for an antenna according to the embodiments of the present invention.

Referring to FIGS. 10 to 14, in the clamping apparatuses for an antenna according to the embodiments of the present invention, the rotation/vibration prevention units 230 and 330 may be implemented as various embodiments so as to provide a reaction force between the worm wheel gear teeth of the worm wheel gears 232 and 332 formed on the outer peripheral surfaces of the tilting shaft 331 and the rotating shaft 231 and the worm gear teeth 234 and 334 formed on the outer peripheral surfaces of the worm gears 233 and 333 to prevent the engaging teeth from being arbitrarily spaced apart from one another.

In more detail, the rotation/vibration prevention units 230 and 330 may have further increased meshing surfaces or maintain meshing forces corresponding to the increased meshing surfaces in comparison with the case in which the worm wheel gear teeth of the worm wheel gears 232 and 332 are provided in the form of spur gear teeth.

Figure 10:
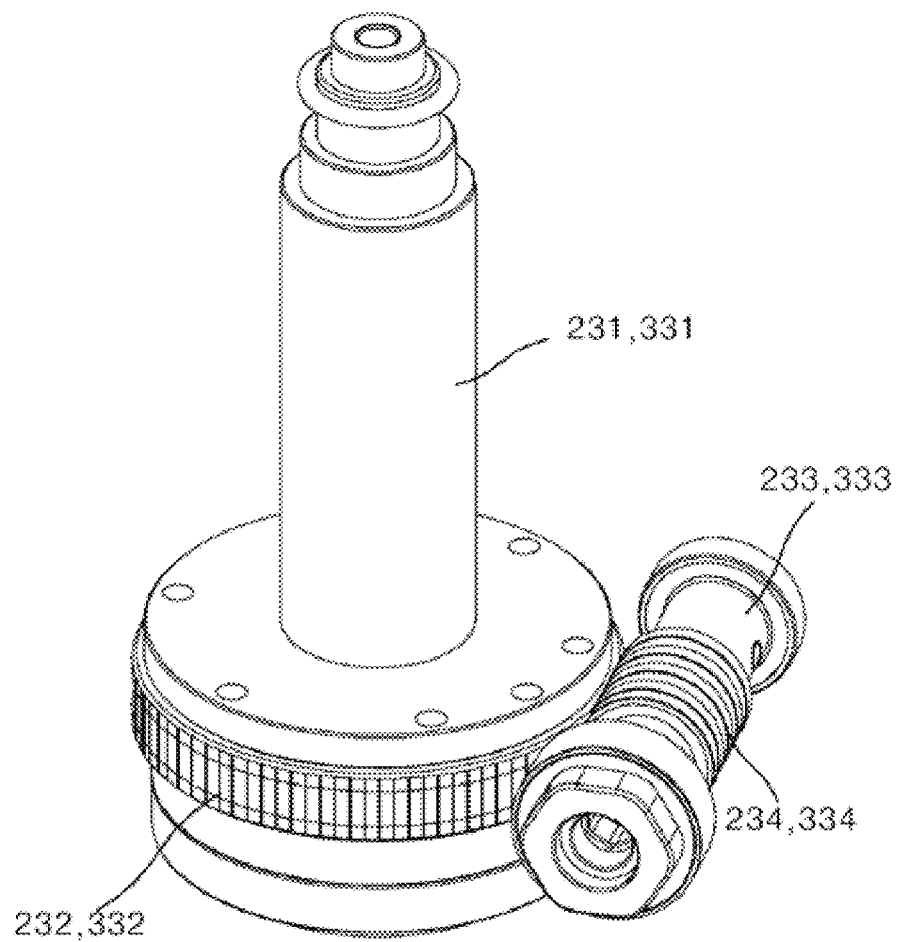
FIGS. 10 to 14 are perspective views illustrating various embodiments of a rotation/vibration prevention unit in the configuration of the clamping apparatus for an antenna according to the embodiments of the present invention.

Referring to FIG. 10, the worm wheel gears 232 and 332 and the worm gears 233 and 333 of the rotation/vibration prevention units 230 and 330 are configured to engage with one another, thereby preventing vibration by using the reaction force, called a gear meshing force, in a case in which separate power is not supplied to the rotation motors 235 and 335 in a state in which the direction of the antenna A is fixed (i.e., in a case in which the rotation of the tilting unit 400 is not the tilting rotation and the rotation of the rotation unit 300 is not the rotating rotation).

In this case, the worm wheel gears 232 and 332 need not necessarily have the spur gear teeth on the outer peripheral surfaces of the tilting shaft 331 and the rotating shaft 231 as the components engaging with the worm gear teeth 234 and 334 of the worm gears 233 and 333, and the worm wheel gears 232 and 332 may of course be provided as helical gears having helical gear teeth. The helical gears may have larger gear meshing surfaces, which engage with the worm gear teeth 234 and 334 of the worm gears 233 and 333, than the gears having spur gear teeth, thereby providing a higher reaction force and an excellent resistive force against vibration from the outside.

Figure 11:
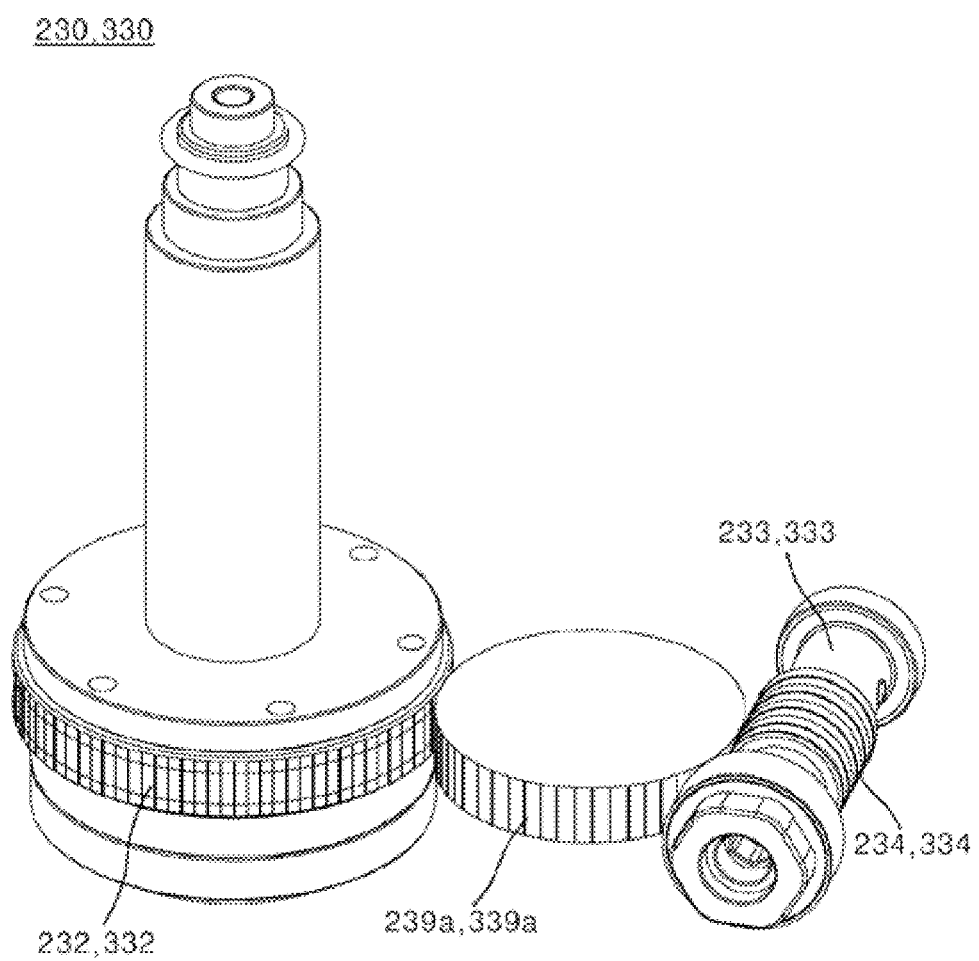

Referring to FIG. 11, the rotation/vibration prevention units 230 and 330 may further include inner damping idle gears 239a and 339a between the worm wheel gears 232 and 332 and the worm gears 233 and 333, unlike the rotation/vibration prevention units 230 and 330 described with reference to FIG. 10.

The inner damping idle gears 239a and 339a may be provided in the form of spur gears capable of engaging with the worm gear teeth 234 and 334 of the worm gears 233 and 333 at one side or provided in the form of worm wheel gears capable of engaging with the worm wheel gear teeth of the worm wheel gears 232 and 332 at the other side.

The inner damping idle gears 239a and 339a may be configured to mediate power transmission between the worm gears 233 and 333 and the worm wheel gears 232 and 332 and serve to change and transmit the rotation direction.

In addition, since the inner damping idle gears 239a and 339a are provided between the worm wheel gears 232 and 332 and the worm gears 233 and 333, the gear meshing areas are increased, thereby indirectly providing a larger amount of reaction force. In more detail, since one end of each of the inner damping idle gears 239a and 339a engages with each of the worm gears 233 and 333, and the other end of each of the inner damping idle gears 239a and 339a engages with each of the worm wheel gears 232 and 332, the meshing area is twice the meshing area in a case in which the worm gears 233 and 333 engage directly with the worm wheel gears 232 and 332.

Further, it is possible to achieve an additional effect of improving gear meshing performance by improving a reduction ratio by appropriately adjusting gear meshing ratios of the inner damping idle gears 239a and 339a.

Figure 12:
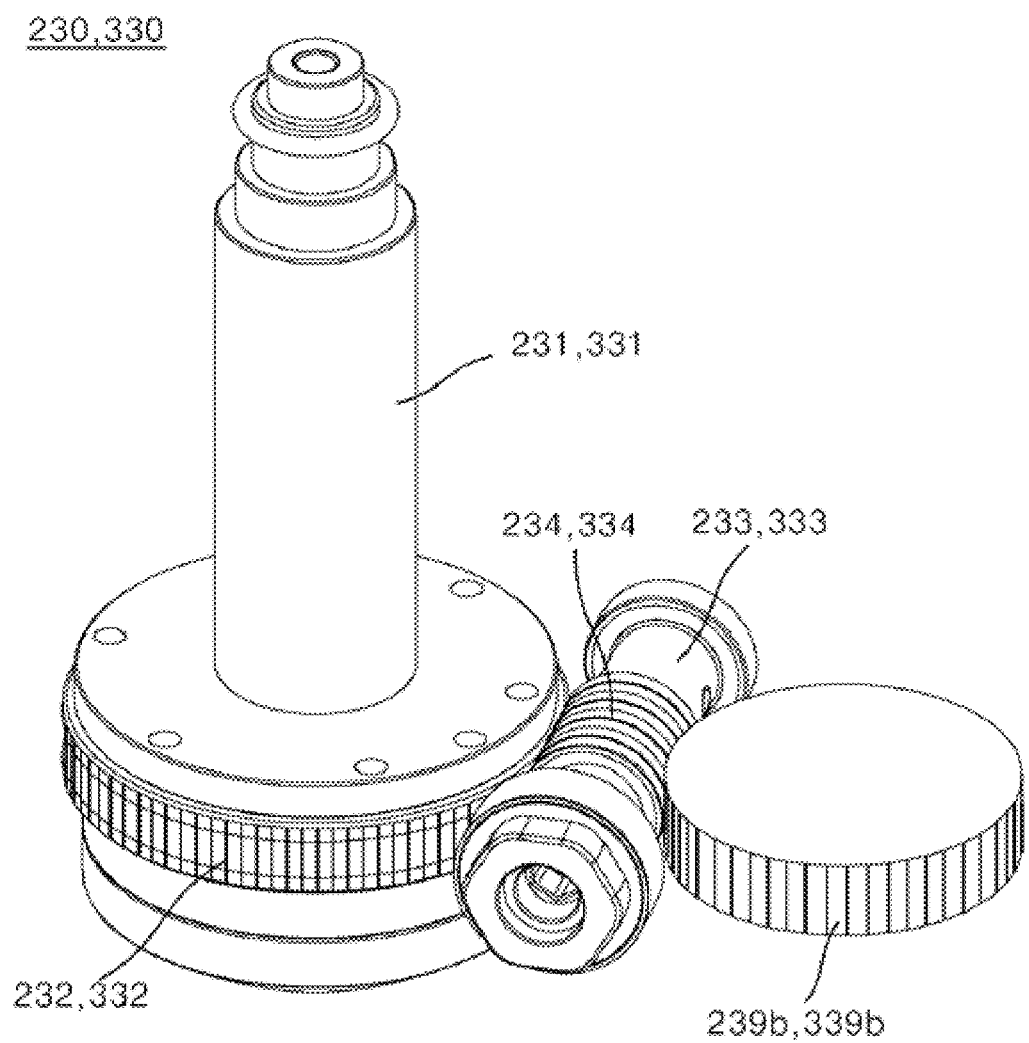

Referring to FIG. 12, the rotation/vibration prevention units 230 and 330 may further include outer damping idle gears 239b and 339b outside the worm gears 233 and 333, unlike the rotation/vibration prevention units 230 and 330 described with reference to FIG. 10. The outer damping idle gears 239b and 339b may be simply idled by the worm gears 233 and 333 when the worm gears 233 and 333 are operated by the rotation motors 235 and 335.

The outer damping idle gears 239b and 339b may be provided in the form of spur gears or worm wheel gears that additionally engage with the worm gear teeth 234 and 334 outside the worm gears 233 and 333 in order to consistently maintain the state in which the worm wheel gears 232 and 332 and the worm gears 233 and 333 engage with one another.

The worm gears 233 and 333 may be provided between the outer damping idle gears 239b and 339b and the worm wheel gears 232 and 332. One side of each of the worm gears 233 and 333 may engage with the gear teeth of each of the outer damping idle gears 239b and 339b, and the other side of each of the worm gears 233 and 333 may engage with the worm wheel gear teeth of each of the worm wheel gears 232 and 332.

According to the outer damping idle gears 239b and 339b described above, since the worm gears 233 and 333 are stably rotated between the worm wheel gears 232 and 332 and the outer damping idle gears 239b and 339b, the separation of the worm gears 233 and 333 from the worm wheel gears 232 and 332 is minimized, such that the rotation unit 300 and the tilting unit 400 are prevented from being arbitrarily rotated by vibration transmitted from the outside.

In more detail, because the worm gears 233 and 333 are supported on the worm wheel gears 232 and 332 by the outer damping idle gears 239b and 339b, an arbitrary separation caused by external vibration may be prevented. Further, because the two opposite sides of each of the worm gears 233 and 333 engage with each of the worm wheel gears 232 and 332 and each of the outer damping idle gears 239b and 339b, the meshing surface may be ensured in a larger area.

Figure 13:
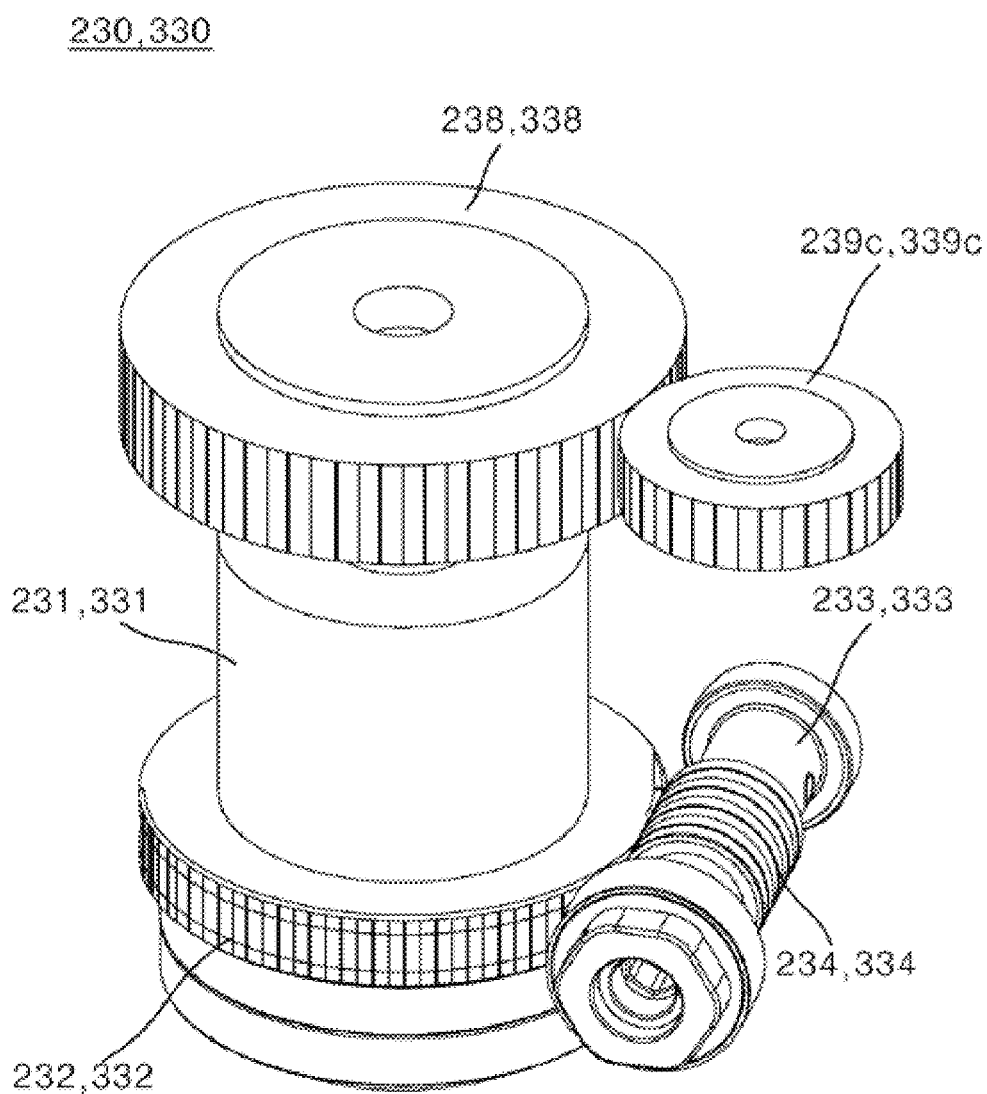

Referring to FIG. 13, the rotation/vibration prevention units 230 and 330 may be implemented to further include additional damping idle gears 239c and 339c configured to engage with brake gears 238 and 338 separately provided at the end of the tilting shaft 331 and the end of the rotating shaft 231, i.e., at the ends opposite to the ends at which the worm wheel gears 232 and 332 are formed, unlike the rotation/vibration prevention units 230 and 330 described with reference to FIG. 10.

That is, unlike the rotation/vibration prevention units 230 and 330 described with reference to FIG. 10, the rotation/vibration prevention units 230 and 330, which are described with reference to FIG. 13, may further include: the brake gears 238 and 338 which are provided on the outer peripheral surfaces of the ends opposite to the ends at which the worm wheel gears 232 and 332 are installed among the two opposite ends of the tilting shaft 331 and the two opposite ends of the rotating shaft 231; and the additional damping idle gears 239c and 339c configured to engage with the brake gears 238 and 338.

According to the rotation/vibration prevention units 230 and 330 implemented as described above, the meshing surfaces of the brake gears 238 and 338 and the meshing surfaces of the additional damping idle gears 239c and 339c may be added to the meshing surfaces of the worm gears 233 and 333 and the meshing surfaces of the worm wheel gears 232 and 332, thereby ensuring larger meshing surfaces. Therefore, it is possible to further maintain the reaction force against vibration transmitted from the outside and prevent the arbitrary rotation of the rotation unit 300 and the arbitrary rotation of the tilting unit 400.

Figure 14:
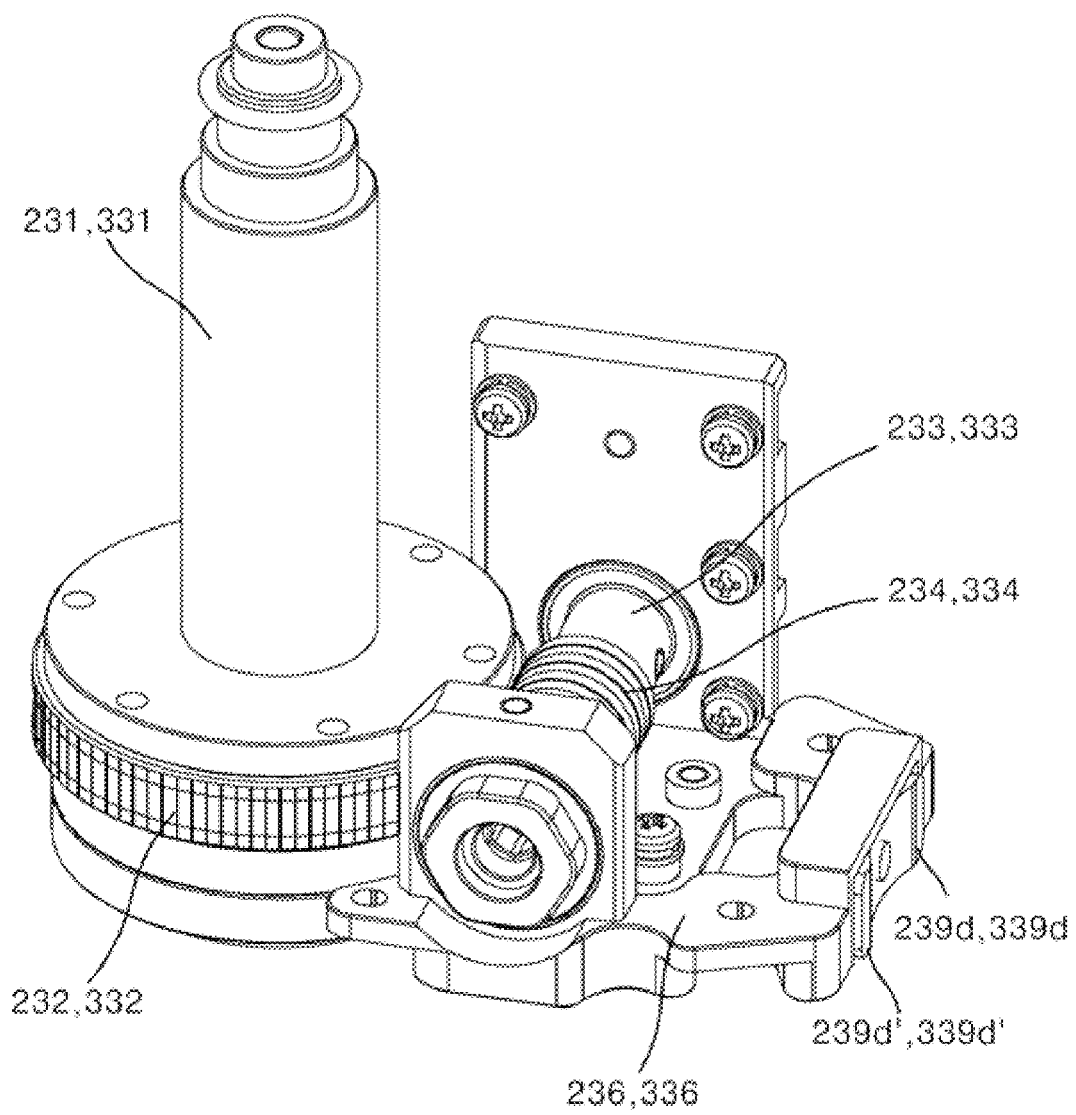

Referring to FIG. 14, the rotation/vibration prevention units 230 and 330 may be implemented to further include leaf spring dampers 239d and 339d provided on the motor brackets 236 and 336 configured to mediate the installation of the worm gears 233 and 333, and the leaf spring dampers 239d and 339d may allow the worm gears 233 and 333 to be in close contact with the worm wheel gears 232 and 332, unlike the rotation/vibration prevention units 230 and 330 described with reference to FIG. 10.

That is, unlike the rotation/vibration prevention units 230 and 330 described with reference to FIG. 10, the rotation/vibration prevention units 230 and 330, which are described with reference to FIG. 14, may include the motor brackets 236 and 336 configured to support the worm gears 233 and 333 so that the worm gears 233 and 333 are rotatable; and the leaf spring dampers 239d and 339d provided at one side of the motor brackets 236 and 336 and configured to elastically support the motor brackets 236 and 336 including the worm gears 233 and 333 toward the worm wheel gears 232 and 332.

Two opposite ends 239d' and 339d' of each of the leaf spring dampers 239d and 339d may be approximately bent and protrude outward and installed on the motor brackets 236 and 336 so as to be supported on the inner surface of the coupling unit housing 220 and the inner surface of the rotating housing 320 on which the rotation/vibration prevention units 230 and 330 are installed.

The leaf spring dampers 239d and 339d described above provide reaction forces that consistently and elastically support the worm gears 233 and 333 to the worm wheel gears 232 and 332 and bring the worm gears 233 and 333 into close contact with the worm wheel gears 232 and 332. Therefore, it is possible to prevent the arbitrary rotations of the rotation unit 300 and the tilting unit 400 caused by vibration transmitted from the outside.

In the embodiment of the rotation/vibration prevention units 230 and 330 described with reference to FIG. 14, the leaf spring dampers 239d and 339d each in the form of a plate spring are exemplarily described. However, any component including a general spring may be applied as long as the component may provide elasticity.

In the embodiment in which the leaf spring dampers 239d and 339d are provided, the elastic supporting force, which supports the worm gears 233 and 333 to the worm wheel gears 232 and 332, may be an elastic supporting force applied to the extent of maintaining the meshing force corresponding to the increased meshing surface in the other embodiments described with reference to FIGS. 10 to 13.

As described above, in the embodiments of the clamping apparatuses for an antenna according to the present invention, the rotation/vibration prevention units include the brake unit, which is the friction structure between the tilting unit 400 and the rotation unit 300, and the brake unit, which is the friction structure between the rotation unit 300 and the common coupling unit 200, and further have the structure changed in design to maintain the meshing surface or the meshing force of the worm gears 233 and 333 and the worm wheel gears 232 and 332 of the tilting angle adjustment unit 330 and the rotating angle adjustment unit 230 that operate to substantially perform the tilting rotation of the tilting unit 400 and the rotating rotation of the rotation unit 300. Therefore, it is possible to prevent the arbitrary movement caused by fine vibration transmitted from the outside.

The embodiments of the clamping apparatus for an antenna according to the present invention have been described in detail above with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the clamping apparatus for an antenna, which is capable of improving a degree of installation freedom and workability at the time of installing the antenna on the support pole with many spatial restrictions.

The invention claimed is:

1. A clamping apparatus for an antenna, the clamping apparatus comprising:
a rotation unit configured to rotate the antenna in a horizontal direction;
a tilting unit configured to rotate the antenna in a vertical direction; and
a rotation/vibration prevention unit configured to adjust a direction of the antenna by rotating at least one of the rotation unit and the tilting unit and prevent the antenna from arbitrarily rotating after the direction of the antenna is adjusted,
wherein the rotation/vibration prevention unit comprises:
a rotation motor;
a worm gear configured to be rotated by the rotation motor;
a shaft configured to define at least one rotation center; and
a worm wheel gear installed on an outer peripheral surface of the shaft and configured to rotate at least one of the rotation unit and the tilting unit while being rotated by the worm gear.

2. The clamping apparatus of claim 1, wherein worm wheel gear teeth of the worm wheel gear are provided in the form of spur gear teeth.

3. The clamping apparatus of claim 1, wherein worm wheel gear teeth of the worm wheel gear are provided in the form of helical gear teeth.

4. The clamping apparatus of claim 1, wherein the rotation/vibration prevention unit further comprises an inner damping idle gear, the inner damping idle gear is provided between the worm gear and the worm wheel gear, one side of the inner damping idle gear engages with worm gear teeth of the worm gear, and the other side of the inner damping idle gear engages with worm wheel gear teeth of the worm wheel gear.

5. The clamping apparatus of claim 4, wherein the inner damping idle gear is provided in the form of a spur gear.

6. The clamping apparatus of claim 4, wherein the inner damping idle gear is provided in the form of a worm wheel gear capable of engaging with the worm wheel gear teeth.

7. The clamping apparatus of claim 1, wherein the rotation/vibration prevention unit further comprises an outer damping idle gear, the worm gear is provided between the outer damping idle gear and the worm wheel gear, one side of the worm gear engages with gear teeth of the outer damping idle gear, and the other side of the worm gear engages with worm wheel gear teeth of the worm wheel gear.

8. The clamping apparatus of claim 7, wherein the outer damping idle gear is provided in the form of a spur gear.

9. The clamping apparatus of claim 7, wherein the outer damping idle gear is provided in the form of a worm wheel gear capable of engaging with the worm wheel gear teeth.

10. The clamping apparatus of claim 1, wherein the rotation/vibration prevention unit further comprises:
a brake gear provided at an end of the shaft; and
an additional damping idle gear configured to engage with the brake gear.

11. The clamping apparatus of claim 1, wherein the rotation/vibration prevention unit further comprises:
a motor bracket configured to support the worm gear so that the worm gear is rotatable; and
a leaf spring damper provided at one side of the motor bracket and configured to elastically support the motor bracket to the worm wheel gear.

* * * * *